UNITED STATES PATENT OFFICE.

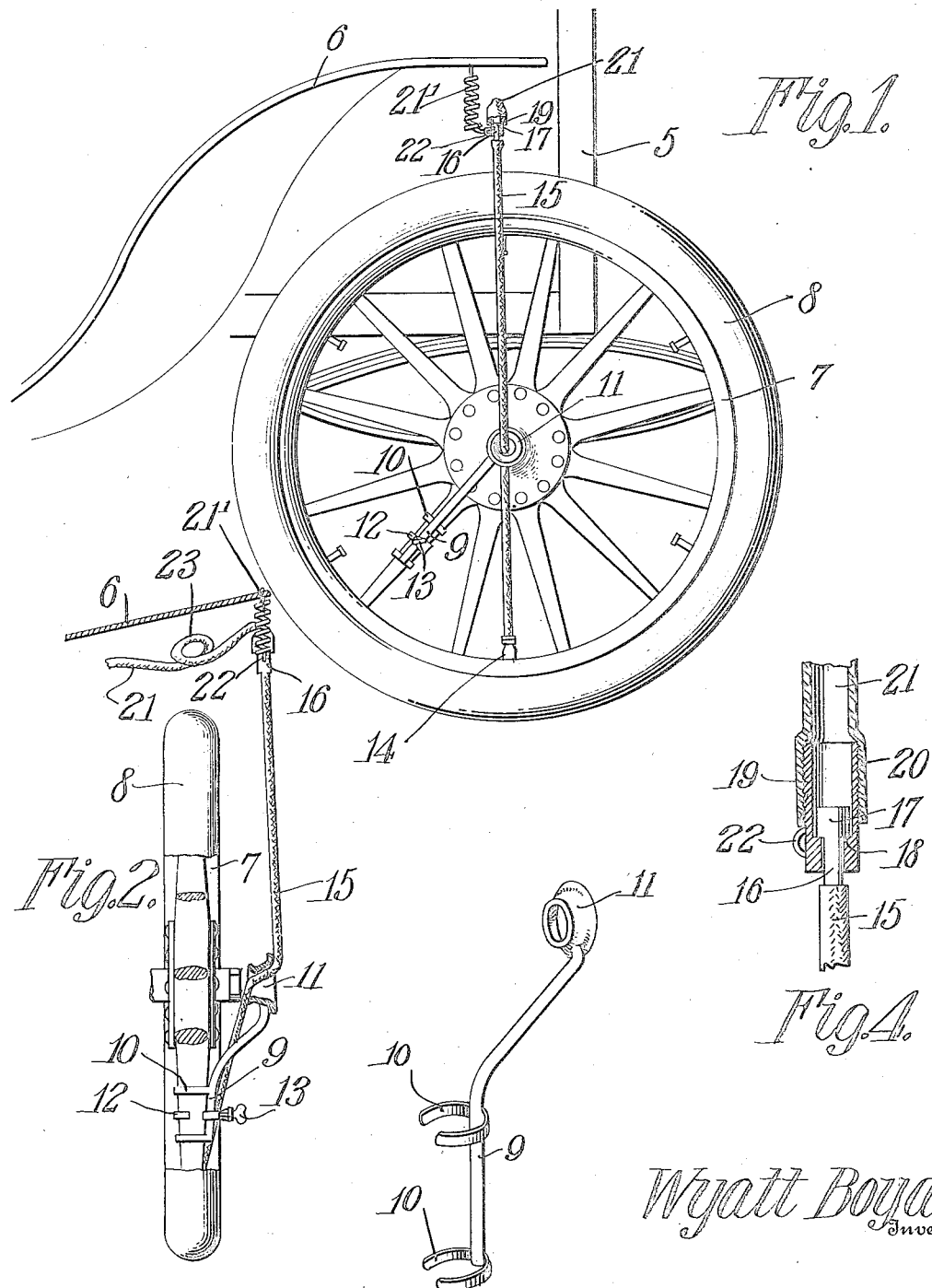

WYATT BOYD, OF SABINA, OHIO.

CONNECTION FOR INFLATING TIRES.

No. 902,644.   Specification of Letters Patent.   Patented Nov. 3, 1908.

Application filed October 29, 1907. Serial No. 399,755.

*To all whom it may concern:*

Be it known that I, WYATT BOYD, a citizen of the United States, residing at Sabina, in the county of Clinton and State of Ohio, have invented a new and useful Connection for Inflating Tires, of which the following is a specification.

This invention relates to hose connections for inflation valves and has for its object to provide a comparatively simple and inexpensive device of this character especially designed for attachment to an automobile, motor cycle or similar vehicle and by means of which the tires of the vehicle may be effectually inflated while the latter is in motion.

A further object of the invention is to provide a supporting bracket having means for attachment to the spokes of a vehicle wheel and provided with a bell shaped annulus for the reception of an air conducting hose thereby to permit free rotation of the vehicle wheel without danger of cutting, abrading or otherwise injuring said hose.

A further object is to provide means for yieldably supporting the hose on the mud guard of the vehicle, said supporting means also serving to retain the mating sections of the hose swivel in contact with each other.

A still further object of the invention is generally to improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a side elevation of a portion of a vehicle provided with a hose connection constructed in accordance with my invention. Fig. 2 is a rear elevation partly in section of the same. Fig. 3 is a detail perspective view of the supporting bracket detached. Fig. 4 is a vertical sectional view of the hose swivel detached.

Similar numerals of reference indicate corresponding parts in all of the figures of the drawings.

The improved device forming the subject matter of the present invention is principally designed for attachment to automobiles, motor cycles and similar vehicles and by way of illustration is shown in connection with a motor car of the ordinary construction in which 5 designates the body of the car, 6 the mud guard and 7 the traction wheel provided with a pneumatic tire, indicated at 8.

The attachment consists of a supporting bracket comprising a bar 9 having one end thereof provided with a plurality of spaced sets of clamping arms 10 adapted to embrace the adjacent spoke of the wheel 7 and having its upper end deflected laterally and provided with a terminal bell shaped annulus or guide ring 11.

The bar 9 is secured to the vehicle wheel by means of a clamp 12 which embraces the bar between the clamping arms 10 and also the adjacent wheel spoke and is provided with an adjusting screw 13 by means of which the attachment may be locked in position on said wheel.

Operatively connected with the valve 14 is one end of an air conducting hose 15 the intermediate portion of which is extended through the bell shaped annulus 11 while its opposite end is secured to the depending stem of a swivel section 16. The swivel section 16 is provided with an enlarged head 17 which bears against an annular shoulder or seat 18 formed in the mating section 19, the latter being provided with exterior corrugations 20 for engagement with an air conducting pipe 21. The pipe 21 is operatively connected with an air compressor of any suitable construction mounted on the automobile or motor car and operated by the latter so that the wheel tires may be inflated without the necessity of stopping the vehicle.

The tube 15 is yieldably suspended from the mud guard 6 by a coiled spring 21' one end of which is secured to a loop or eye 22 on the swivel section 19 while the opposite end thereof is fastened in any suitable manner to said guard, as shown. The spring 21' forms a yieldable connection between the tube 15 and mud guard 6 so as to prevent injury to said tube when the vehicle is traveling over rough uneven roads. The spring 21' not only serves to prevent injury to the tube 15 but also serves to yieldably support the head 17 of the swivel section 16 in engagement with the shoulder 18 of the mating section so as to form a firm contact between the two and thus prevent the escape of air.

The interior walls of the annulus 11 at the enlarged end thereof are flared outwardly while the interior walls of the annulus at the reduced end thereof are curved laterally so as to prevent the tube 15 from becoming cut or severed by contact with the annulus when the wheel revolves.

In using the device the supporting bracket is positioned on one of the spokes of the vehicle with the annulus 11 spaced from and disposed concentric with the hub of the wheel after which the tube 15 is connected with the valve and thence passed through the annulus 11 for attachment to the stem of the swivel section 16, one or more convolutions 23 being formed in the flexible supply pipe 21 so as to allow for any longitudinal movement of the tube 15.

It will thus be seen that when the vehicle wheel is in motion the supporting bracket will revolve with the same and the bell 11 being disposed concentric with the axle of the vehicle will permit the intermediate portion of the tube 15 to revolve around the inclined wall of said annulus, any twisting or torsional movement of the tube being prevented by the swivel section 16.

While the tube 15 is shown extended in a vertical plane for attachment to a mud guard it is obvious that the same may be arranged in a horizontal plane and attached to any other desired portion of the vehicle.

From the foregoing description it will be seen that there is provided an extremely simple, inexpensive and efficient device admirably adapted for the attainment of the ends in view.

Having thus described the invention what is claimed is:

1. A connection for inflation valves comprising a supporting bracket having means for attachment to a vehicle wheel and provided with an annulus, and a fluid conducting tube extending through said annulus and having one end thereof secured to the valve and its opposite end connected with a source of fluid supply.

2. A connection for inflation valves comprising a supporting bracket having one end thereof provided with laterally extending arms for engagement with the spokes of a vehicle wheel and its opposite end provided with a bell shaped annulus, and an air conducting tube extending through said annulus and operatively connected with the valve.

3. A connection for inflation valves comprising a supporting bracket having one end thereof provided with means for attachment to the spokes of a vehicle wheel and its opposite end provided with a bell shaped annulus, a tube extending through the annulus and operatively connected with the valve, a supply pipe, and a swivel connection between the supply pipe and tube.

4. A connection for inflation valves comprising a bracket having one end thereof provided with a plurality of spaced sets of clamping arms adapted to embrace the adjacent spoke of a vehicle wheel and having its opposite end extended laterally and provided with an annulus the interior walls of which are curved laterally, an air conducting tube extending through the annulus and operatively connected with the valve, a supply pipe, and a swivel connection between the supply pipe and tube.

5. The combination with a vehicle having a traction wheel and provided with an inflation valve, of a supporting bracket secured to the wheel of the vehicle and provided with an annulus disposed concentric with the hub of the wheel, a fluid conductor extending through the annulus for connection with the valve, a supply pipe, a swivel connection between the supply pipe and conductor, and means for suspending the conductor from the vehicle.

6. The combination with a vehicle having a traction wheel provided with an inflation valve, a bracket having one end thereof provided with spaced arms adapted to embrace one of the spokes of the wheel and having its opposite end off set and provided with a terminal annulus disposed concentric with the hub of the wheel, a clamp embracing the bracket and the adjacent spoke of the wheel, a swivel including mating sections one of which is provided with a laterally extending eye, a supply pipe secured to one of the sections of the swivel, an air conducting tube secured to the other section of the swivel and having its intermediate portion extended through the annulus for attachment to the valve, and a spring secured to the eye of said swivel section and operatively connected with the vehicle.

In testimony that I claim the foregoing as my own, I have hereto affixed my signature in the presence of two witnesses.

WYATT BOYD.

Witnesses:
C. C. HILL,
HAZEL GATES.